Oct. 9, 1956
W. F. PANSING
2,766,185
FLUIDIZED SOLIDS CONTACTING SYSTEM
FOR THE REFORMING OF HYDROCARBONS
Filed Feb. 6, 1953
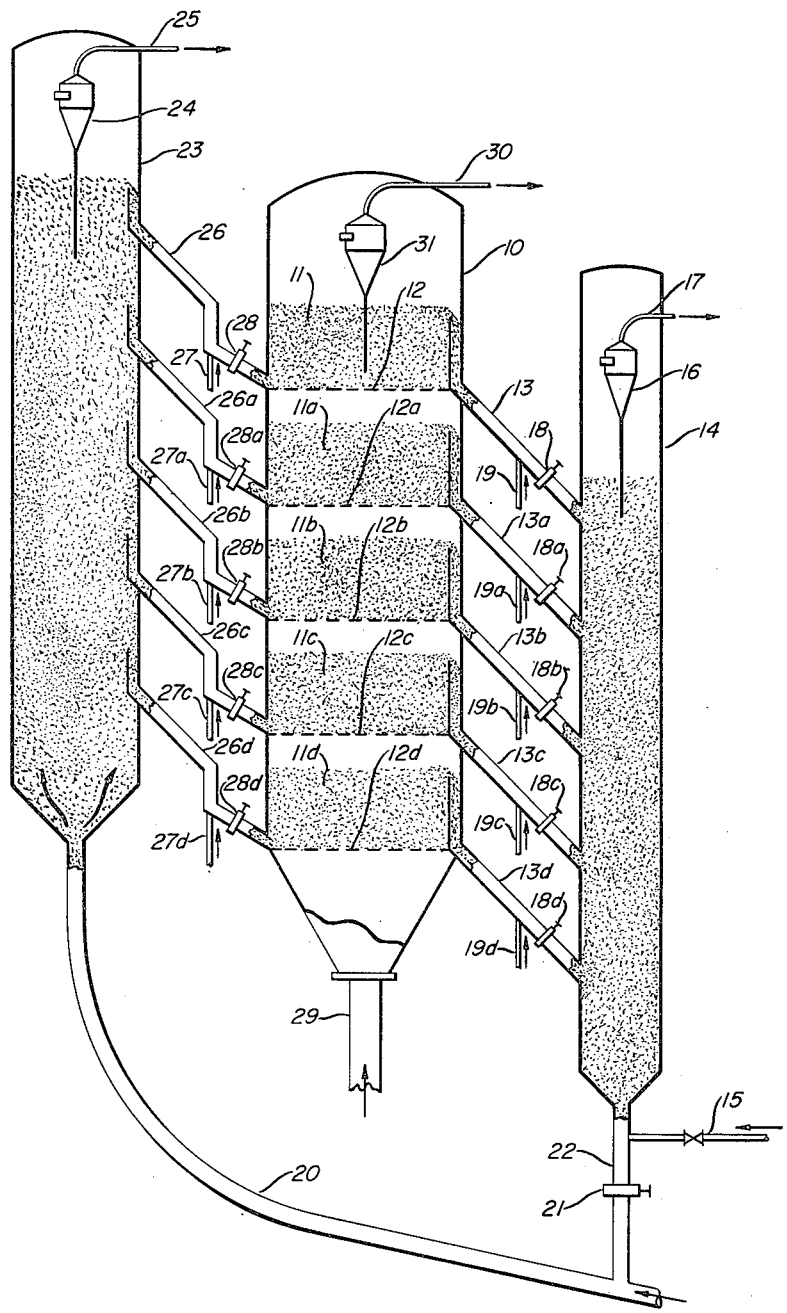
INVENTOR.
William F. Pansing
BY Everett A. Johnson
ATTORNEY

United States Patent Office 2,766,185
Patented Oct. 9, 1956

2,766,185

FLUIDIZED SOLIDS CONTACTING SYSTEM FOR THE REFORMING OF HYDROCARBONS

William F. Pansing, Highland, Ind., assignor to Standard Oil Company, Chicago, Ill., a corporation of Indiana Application February 6, 1953, Serial No. 335,571

9 Claims. (Cl. 196—50)

This invention relates to a process and an apparatus for effecting controlled contact between gases and solids.

The fluid technique of contacting finely divided solids with gases has found extensive application in many types of chemical processes, both catalytic and non-catalytic, exothermic and endothermic. In such fluid technique the fluidized solids operations are characterized by a substantial uniformity of temperature through the fluidized bed of solids as a result of the rapid internal circulating of the solid and the accompanying extremely rapid rate of heat transfer from one section of bed to another. However, this results in a limitation in any process where it is desired to vary heat input to a fluidized bed along the path of the flow of gases through the bed. For example, with highly endothermic reactions, the optimum temperature levels cannot be maintained by introducing hot catalyst at a single point. It is, therefore, an object of my invention to provide a method and apparatus wherein the advantages inherent in the fluent technique of contact are utilized, but wherein the ease of control of temperature differential over the length of the contacting zone is increased.

Another disadvantage of such systems is that where a gasiform fluid is passed upwardly through a mass of finely divided catalyst a portion of the reactant fluid and products is recirculated within the mass for a prolonged period of time. This back circulation of reaction products results in a prolonged contact time which is not desirable. Furthermore, such back-mixing dilutes the feed with reaction products. Accordingly, another object of this invention is to provide means for reducing the back circulation of gasiform fluids in a fluidized catalyst contacting zone. A further object is to prevent the formation of large gas pockets which cause surging or slugging of the finely divided solids within the contacting zone.

In reforming processes such as those employing molybdena and platinum-type catalyst, it may be desirable to employ different temperatures in the initial contacting of the charge and in the final contacting of the stream of residual charge and intermediate products. Heretofore, numerous systems have been proposed for attempting to maintain a temperature gradient in a deep catalyst bed, but without significant success. The problem is further complicated by the fact that it is desirable to employ the catalyst for a longer period of time at one temperature level than at another and this condition is not readily attainable by conventional fluidized catalyst systems heretofore used.

In view of the above, the objects of the present invention include the provision of a fluidized reactor design which minimizes the back-mixing, prevents excess channeling, and affords better heat input control. These and other objects of the invention will become apparent as the description thereof proceeds.

Briefly, my invention comprises a fluidized bed reactor which is subdivided into a series of vertically spaced sections or zones which are separated by perforated plates. Each reactor section is provided with a separate hot catalyst feed line and a separate drawoff line. A single regenerator and a single collecting standpipe are, respectively, manifolded to the catalyst feed lines and to the catalyst drawoffs. This arrangement prevents back-mixing of gas and, in addition, the perforated plates effectively redistribute the gas from a subjacent catalyst mass through the next higher catalyst bed. Thus, the tendency for a bubble or slug of gas to travel upwardly through the entire length of the catalytic zone is eliminated.

The rate of catalyst introduction from the catalyst transfer or feed lines to the individual sections or beds is independently controlled to provide any particular catalyst temperature in a given zone. Heaters or coolers can be applied to the transfer lines to effect any desired temperature in a given section. Further, the catalyst feed rate and the catalyst residence times are thereby individually controlled in each section to provide the optimum progressive treatment for a gas stream passing upwardly through the column or vessel.

The apparatus can be applied to any number of processes among which may be mentioned catalytic cracking of petroleum fractions, the synthesis of hydrocarbons from $CO_2$ and $H_2$, absorption, hydroforming, and the like. However, the invention is particularly useful in a selected reaction-type process such as hydroforming with molybdena-alumina or platinum-on-alumina catalyst and my improvement will be described in connection with such a process.

It has been observed in hydroforming that some of the many reactions occurring are highly endothermic and some are exothermic. Thus, the average temperature in a single fluidized bed may not be the optimum temperature for all the reactions occurring. Further, the conversion of naphthenes to aromatics is rapid at lower temperatures which prevent cracking of the naphthenes. However, isomerization of paraffins is more favorable at higher temperatures when the aromatics are more refractory than naphthenes. Therefore, I may operate a series of beds in a single contacting zone at a temperature of about 875° F. in the initial section and increase the catalyst temperatures in the remaining sections, but maintain a maximum temperature in the last section at a selected level such as about 950° to 1000° F.

Referring to the drawings, I have illustrated a reactor 10 which is subdivided into a plurality of catalyst beds 11 by individual perforated plates 12. Spent catalyst is removed from each bed 11 by the individual drawoffs 13 which transfer catalyst from a high point in each section 11 to the standpipe-stripper 14. A stripping medium such as steam is introduced via line 15 and removed from the stripper 14 through cyclone 16 and vent 17.

The spent and stripped catalyst is introduced into transfer line 20 through valve 21 via short standpipe 22. A carrier gas is introduced into transfer line 20 wherein the stripped catalyst from standpipe 22 is suspended and carried into the regenerator 23. The carrier gas may be combustion air or some other gas in which case the air may be introduced separately into the carrier line 20 or at the bottom of the regenerator 23.

In the regenerator 23 a temperature of about 1100° F. is maintained and air may be supplied to it at an upward velocity of 0.5 foot per second. The pressure within the regenerator is about 200 p. s. i. and flue gas is withdrawn from cyclone or filters 24 via line 25. If desired, this flue gas may be utilized to supply heat to one or more of the catalyst feed lines 26 whereby catalyst is being transferred from the regenerator 23 to the reactor 10. A buffer or aerating gas, such as steam, is introduced at 27 into feed lines 26 at selected temperature levels so as to assist in the control of the flow and in the control of the temperature of the solids being transferred from the regenerator 23 to the reactor 10.

The reactor 10 may have overall dimensions of about 15 feet I. D. and an overall height of about 32 feet, the plates 12 being spaced so that each bed is about 3.5 feet deep. The stripper 14 may be about 4 feet I. D. and from about 10 to 25 feet high.

Fresh make-up catalyst may be introduced into the system by a suitable catalyst transfer drum (not shown). If desired, the make-up catalyst can be supplied to the stripper 14 and circulated therein with recycled catalyst which is being transferred, but the fresh catalyst would pass through the regenerator 23 before circulation across the separate beds 11 in the reactor 10.

Feed is introduced via line 29 and passed upwardly through the succession of beds 11d to 11 and the products withdrawn by overhead line 30. If desired, cyclones 31 can be provided within the reactor 10 above the topmost bed 11. The recovered reaction products are processed to recover a recycle gas fraction comprising about 75% hydrogen plus $C_3$ and lighter fractions. This recycle gas is then introduced into the reactor 10 together with pre-heated naphtha via line 29. The gas can be separately pre-heated to a temperature of about 1000° F. or more and the naphtha to about 800° F. or more but less than 950° F., the circulated pre-heated streams being introduced via line 29 at a net temperature of about 875° F.

Thus, in the method of reforming hydrocarbons I maintain a plurality of segregated beds 11 of fluidized solids and introduce preheated streams of hydrocarbon vapors and hydrogen below the first of the segregated beds 11 via line 29. Solids from each of the separate zones are withdrawn at separately controlled rates via line 13 into a stripper zone 14. Stripping gas is passed upwardly via line 15 through the stripping zone 14 and stripped solids downwardly from the stripping zone to a regenerator zone. Hot regenerated catalyst from said regeneration zone 23 is transferred to the segregated fluidized zones.

The introduction and withdrawal of solids from each of zones 11 to 11d are independently controlled whereby the temperature in the lowest of said zones is maintained within the range of between about 825° and 875° F., the temperature in the final zone is maintained at between about 950° and 1000° F. and the intermediate zones are maintained at a temperature of between about 875° and 950° F. whereby dehydrogenation is the predominate reaction in the first zone and isomerization is the predominate reaction in the final zone. When the catalyst is platinum-on-alumina the preferred temperatures are 850° F., 920° F. and 975° F. in the initial, intermediate and final zones, respectively.

Although stripping steam has been shown as being introduced into the standpipe 22, it is also contemplated that stripping can be effected within the reactor drawoffs 13 and the stripping products recovered along with the reaction products withdrawn from the reactor 10. In such an arrangement, the valves 18 in the drawoffs 13 would be placed adjacent the standpipe 14 and the stripping steam introduced by lines 19 above the valves 18 so as to flow upwardly counter-current to the catalyst stream being transferred downwardly therethrough.

Although I have described my invention in terms of specific examples, which are set forth in considerable detail, it should be understood that these are by way of illustration only and that the invention is not limited thereto. Alternative embodiments and operating techniques will become apparent to those skilled in the art in view of my disclosure and accordingly, modifications in my invention are contemplated without departing from the spirit of the described invention.

What I claim is:

1. An apparatus for contacting solids and gases which comprises a first vertically elongated vessel, a plurality of grid baffles in said first vessel dividing said vessel into vertically spaced chambers, said baffles being adapted to support a mass of fluidized catalyst thereabove while permitting the flow of gasiform fluids therethrough, a second elongated vessel adjacent said first vessel, a plurality of separate valved conduits extending downwardly from said plurality of chambers directly to said second vessel, said valved conduits comprising the sole means for transferring solids from each chamber and from said first vessel, a third vertically elongated vessel adjacent said first and second vessels, a transfer conduit means extending between the bottom of said second vessel and the bottom of said third vessel, and a plurality of valved ducts inclined downwardly from vertically spaced points in said third vessel to a low point in each of said chambers in said first vessel, said valved ducts comprising the sole means for supplying solids to said first vessel, a gas inlet at the bottom of said first vessel and a gas outlet at the top of said first vessel, and a means for introducing carrier gas into said transfer line means whereby finely divided solids are caused to circulate from said second vessel, through said transfer line, upwardly into said third vessel, downwardly in separately controlled streams to each of said chambers via said inclined conduit means, laterally across said chambers, and downwardly from said chambers in separate streams into said second vessel.

2. The apparatus of claim 1 wherein said first vessel is a reactor, said second vessel is a standpipe-stripper, and said third vessel is an exothermic regenerator.

3. The apparatus of claim 2 wherein the flow of hot solids from the third vessel is regulated to control the temperature in each of said chambers.

4. The method of maintaining a temperature differential from end to end in a vertically elongated contacting chamber containing fluidized solids which comprises the steps of maintaining a plurality of vertically spaced segregated zones containing fluidized solids, separately withdrawing fluidized solids downwardly from each of said vertically spaced zones to a solids accumulation zone exterior of said chamber, transferring the accumulated solids from said accumulation zone into a regeneration zone, introducing hot regenerated solids from said regeneration zone into each of said vertically spaced contacting zones, controlling the rate of introduction of hot regenerated solids so as to maintain a temperature differential between contacting zones, flowing a hydrocarbon-containing gasiform stream upwardly in series through said contacting zones, and independently controlling the rate of separate withdrawal of solids from each of said segregated contacting zones whereby a long solids residence time and low temperature are obtained in one of said contacting zones and a short solids residence time and high temperature are maintained in a vertically spaced contacting zone.

5. The process of claim 4 wherein the fluidized solids comprise a reforming catalyst and the gasiform charge comprises hydrogen and normally liquid hydrocarbons in the naphtha boiling range.

6. The method of reforming hydrocarbons which comprises the steps of maintaining beds of fluidized solids in a plurality of segregated zones, introducing pre-heated streams of hydrocarbon vapors and hydrogen below the first of said segregated zones of fluidized solids transferring solids having carbonaceous deposits thereon directly from each of said zones into a single stripper zone, passing a stripping gas upwardly through said stripping zone, transferring stripped solids from said stripping zone to a regeneration zone, maintaining said regeneration zone at about 1100° F. by burning carbonaceous deposits from said solids, introducing separate streams of hot solids from said regeneration zone to each of said segregated fluidized zones, and independently controlling the introduction and withdrawal of solids from each of said segregated fluidized zones whereby the temperature in the first of said zones is maintained within the range of between about 850° and 940° F., the temperature in the final zone is maintained at above about 975° F. and the intermediate zones are maintained at a temperature intermediate those of said first and final zones whereby dehydrogenation is the predominate reaction in the first zone and isomerization is the predominate reaction in the final zone.

7. The process of claim 6 wherein the solids are molybdena-alumina catalyst and the vapors are of hydrocarbons boiling in the naphtha range.

8. An apparatus for contacting solids and gasiform fluids which comprises a vertically elongated vessel, a fluid inlet conduit at the bottom of said vessel and a fluid outlet conduit in an upper part of said vessel, a plurality of grid baffles arranged across the flow area of said vessel at vertically spaced points therein, said baffles defining a plurality of vertically spaced chambers within said vessel, a separate solids inlet for each of said chambers, said inlet discharging into each said chamber above and adjacent the lower grid baffle of each chamber, a valve means on said solid inlet for independently controlling the rate of introduction of solids of the superposed chambers, a separate solids draw-off for each of said chambers communicating with the associated chamber at an elevated point with respect to the discharge end thereof exterior of said vessel, manifold means exterior of said vessel for commingling solids withdrawn from each of said chambers, a second contacting vessel adjacent said elongated vessel, conduit means extending between the bottom of said manifold means and the bottom of said second vessel, said solids inlet means having one end thereof in communication with said second vessel at vertically spaced points which are elevated with respect to the associated grid baffle in the elongated vessel.

9. An apparatus for contacting solids and gasiform fluids which comprises a vertically elongated reactor vessel, a fluid inlet conduit at the bottom of said vessel and a fluid outlet conduit in an upper part of said vessel, a plurality of grid baffles arranged across the flow area of said vessel supporting a plurality of fluidized beds of solids at vertically spaced points therein, said baffles defining a plurality of vertically spaced chambers within said vessel, a separate solids inlet for each of said spaced chambers, each of said inlets discharging into each of said chambers above and adjacent the lower grid baffle of each vertically spaced chamber, valve means on said solids inlets for independently controlling the rate of introduction of solids to the superposed chambers, charge gas conduits discharging into each of said inlets, a separate solids drawoff for each of said chambers extending from a high point in each of said chambers and discharging at a point approximating the level of the baffle grid defining the chamber next below, manifold means exterior of said vessel into which each of said drawoffs discharge at vertically spaced points, a second contacting vessel adjacent said reactor vessel, conduit means extending between the bottom of said manifold means and the bottom of said second vessel, said solids inlet means having one end thereof in communication with said second vessel at vertically spaced points, the inlet ends of said inlet means being elevated with respect to the grid baffle onto which it discharges at a point approximating the level of the grid baffle defining the chamber next below.

References Cited in the file of this patent

UNITED STATES PATENTS

| | | |
|---|---|---|
| 2,444,990 | Hemminger | July 13, 1948 |
| 2,471,084 | Wilcox | May 24, 1949 |
| 2,518,474 | Hudson | Aug. 15, 1950 |
| 2,585,238 | Gerhold | Feb. 12, 1952 |
| 2,602,771 | Munday et al. | July 8, 1952 |